United States Patent Office 3,453,327
Patented July 1, 1969

3,453,327
PINENE DIAMINES AND METHOD OF PREPARATION
Robert W. White, Willingboro, N.J., and Joseph L. O'Brien, Southampton, Pa., assignors to Rohm and Haas Company, Philadelphia, Pa., a corporation of Delaware
No Drawing. Continuation of application Ser. No. 428,195, Jan. 26, 1965. This application Aug. 12, 1968, Ser. No. 754,097
Int. Cl. C07c 87/38, 87/50, 87/54
U.S. Cl. 260—563                          7 Claims

ABSTRACT OF THE DISCLOSURE

Pinene diamines having the formula

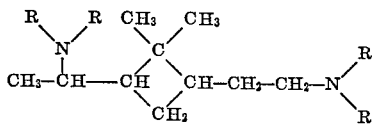

wherein R represents hydrogen, alkyl of 1 to 12 carbon atoms, phenyl, alkyl-substituted phenyl, in which the alkyl substituent contains up to 8 carbon atoms, aralkyl and alkyl-substituted aralkyl, in which the alkyl substituent contains up to 8 carbon atoms.

---

The primary and secondary diamines are useful as intermediates in the preparation of polyamides, and the novel tertiary diamines are useful as catalysts in the preparation of urethane foams.

This application is a continuation of our copending application Serial No. 428,195, filed Jan. 26, 1965, and now abandoned.

This invention deals with specific pinene diamines as new compositions of matter. It further relates to a method for the preparation of these pinene diamines.

The compounds of the present invention may be represented by the following formula:

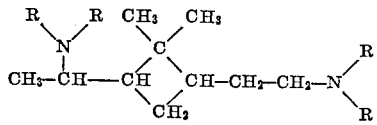

in which the R groups may represent hydrogen, alkyl of 1 to 12 carbon atoms, phenyl, alkyl-substituted phenyl, in which the alkyl substituent contains up to 8 carbon atoms, aralkyl and alkyl-substituted aralkyl, in which the alkyl substituent contains up to 8 carbon atoms. Within any one compound, the R groups may be the same or different, as desired. The alkyl substitution within the phenyl and aralkyl definition may be satisfied by one or more alkyl groups as long as the limitation as to carbon content is observed.

Typically, the R groups may represent hydrogen, methyl, ethyl, butyl, hexyl, octyl, phenyl, dimethylphenyl, diethylphenyl, benzyl, dimethylbenzyl and dibutylbenzyl. The alkyl groups within the R definition may exhibit any of the known spatial configurations, such as normal, iso or tertiary, as desired.

The novel products of the present invention are prepared by the ozonidation of α-pinene, followed by reductive amination of the ozonide formed. The ozonization is conducted by passing ozone into an alkanolic solution of α-pinene. The alkanols employed are those containing from 1 to 8 carbon atoms and may be primary, secondary or tertiary alkanoic structures. Typically, one may employ methanol, ethanol, n-propanol, iso-propanol, n-butanol, t-butanol, hexanol or t-octanol. The ozonization is conducted at reaction temperatures of about −40°C. to about +40° C.

At the conclusion of the ozonization, the ozonide formed is reductively aminated by first reacting the ozonide with one molar equivalent of hydrogen. This reaction is conducted in the presence of nickel, cobalt or rhodium hydrogenation catalysts, such as the typical Raney nickel or Raney cobalt. The reaction temperature is maintained at about −40° to +50° C., preferably 0° to 20° C., at a hydrogen pressure of about 50 to 500 p.s.i.g., preferably 50 to 200 p.si.g. The reaction of the one molar equivalent of hydrogen with the ozonide can be followed by observing the exothermic heat of reaction. When the exothermic heat of reaction ebbs, then the mole of hydrogen has reacted essentially completely.

After one molar equivalent of hyrrogen has reacted with the ozonide, there is then introduced ammonia or an amine corresponding to the R groups previously defined. The amination step is conducted in the presence of hydrogen at a temperature of about 50° to 250° C., preferably 60° to 100° C.; pressures in the range of 300° to 3000 p.si.g., preferably 500 to 1000 p.s.i.g., are employed. The amination is also conducted in the presence of a hydrogenation catalyst, as defined previously.

At the conclusion of the reaction, the product is isolated, after removal of the catalyst by conventional techniques, by distillation or crystallization.

Typical reactants that may be employed in the amination step include ammonia, methylamine, dimethylamine, ethylamine, diethylamine, butylamine, octylamine, dioctylamine, phenylamine, dibutylphenylamine, phenylmethylamine, phenylethylamine, diphenylamine, benzylamine, dibenzylamine, octylbenzylamine, octylbenzylethylamine and dibutylbenzylamine.

he pinene diamine product is consistently obtained in yields of 80 to 95% or better, frequently approaching the theoretically quantitative amount. The pinene diamine product may be a primary, secondary or tertiary diamine, depending on the embodiments of the R groups. If mixtures of ammonia or various amines are employed in the amination, then mixtures of primary, secondary or tertiary diamines are obtained as the product. The primary diamine product may be reacted with dibasic acids to form polyamides, which are useful as films and fibers, of substantial strength and clarity. The secondary diamine products with dibasic acids form polymeric polyamides which can be formed into superior elastomeric fibers. The tertiary diamine products are useful as catalysts for the preparation of urethane foams. The fibers described above are suitable for use in the preparation of wearing apparel by known techniques. The films are useful as packaging materials. The foams are useful as cushions and the like.

This invention may be more fully understood from the following illustrative examples:

EXAMPLE I 1-(2-aminoethyl)-3-(1-aminoethyl)-2,2-dimethylcyclobutane

A solution of 151 g. of 90% α-pinene in 400 ml. of methanol was cooled to 10° C. while 52 g. of ozone (as a 2% ozone in oxygen stream) were added. The solution was placed in a stirred autoclave with 10 g. of Raney nickel, and reduced at 10° C. with hydrogen at 100 p.s.i.g. until one equivalent of hydrogen reacted. There were then introduced 80 g. of ammonia and the hydrogen pressure was raised to 600 p.s.i.g. The reductive amination was carried out for 6 hours at 85° C. The diamine, after removal of the solvent and catalyst, was isolated by distillation, B.P. 98–99° C. (4 mm.), N.E. 86 (calc. for $C_{10}H_{22}N_2$—85), in 85% yield.

EXAMPLE II 1-(2-methylaminoethyl)-3-(1-methylaminoethyl)-2,2-dimethylcyclobutane A solution of 151 g. of 90% α-pinene in 400 ml. of methanol was ozonized with 52 g. of ozone (as a 2% ozone in oxygen stream). The solution was partially reduced as described in Example I. A solution of 125 g. of methylamine in 250 ml. of methanol was added to the autoclave; the hydrogen pressure was raised to 700 p.s.i.g. and the reductive amination was carried out at 100° C. for 7 hours. The solvent and catalyst were removed and distillation of the residue yielded the product, B.P. 66–68° C. (0.5 mm.), N.E. 102 (calc. for $C_{12}H_{26}N_2$—99).

EXAMPLE III

Preparation of 1-(2-dimethylaminoethyl)-3-(1-dimethylaminoethyl)-2,2-dimethylcyclobutane A solution of α-pinene in methanol was ozonized and partially reduced as described in Examples I and II. A solution of 180 g. of dimethylamine in 400 ml. of methanol was added to the autoclave, and the reductive amination was carried out at 1000 p.s.i.g. and 100° C. for 10 hours. Removal of catalyst and solvent gave a crude product which was purified by distillation to give the pure ditertiary amine, B.P. 75–80° C. (0.2–0.4 mm.), $n_D^{26}$ 1.4601, N.E. 115 (calc. for $C_{14}H_{30}N_2$—113).

EXAMPLE IV

Preparation of 1-(2-aminoethyl)-3-(1-aminoethyl)-2,2-dimethylcyclobutane

A solution of 151 g. of 90% α-pinene in 350 ml. of n-butyl alcohol was treated over a 2-hour period with 52 g. of ozone (as a 2% ozone in oxygen stream). The solution was charged to a stirred autoclave with 10 g. Raney nickel and partially reduced at a hydrogen pressure of 200 p.s.i.g. at 8° C. Ammonia (70 g.) was added and the reductive amination was finished at 85° C. for 6½ hours. Workup of the reaction was accomplished as described in the first example to yield 135 g. of diamine.

EXAMPLE V

Preparation of 1-(2-isobutylaminoethyl)-3-(1-isobutylaminoethyl)-2,2-dimethylcyclobutane A solution of α-pinene in n-butyl alcohol was ozonized and partially reduced as described in Example IV. Reductive amination was carried out by addition of 220 g. of isobutylamine, after which the hydrogen pressure and temperature were adjusted to 800 p.s.i.g. and 100° C. respectively for 7 hours. The product, B.P. 110° C. (0.1 mm.), N.E. 145 (calc. for $C_{18}H_{38}N_2$—141), was isolated in 75% yield.

EXAMPLE VI

Preparation of 1-(2-aminoethyl)-3-(1-aminoethyl)-2,2-dimethylcyclobutane

A solution of α-pinene in methanol was ozonized as described in Example I. The solution was charged to a stirred autoclave with 3 g. of 10% rhodium on carbon catalyst and partially reduced at 5° C. with hydrogen at 75 p.s.i.g. pressure. The reductive amination was carried out at 200 p.s.i.g. and 60° C. for 12 hours after addition of 80 g. of ammonia. The product diamine was isolated in 86% yield.

We claim:
1. A composition of matter having the formula

$$\begin{array}{c} R \\ \diagdown \\ N \\ \diagup \\ R \end{array} \begin{array}{c} R \\ | \\ CH_3-CH-CH \end{array} \begin{array}{c} CH_3 \ CH_3 \\ \diagdown \diagup \\ C \\ \diagup \diagdown \\ CH-CH_2-CH_2-N \\ \diagup \\ CH_2 \end{array} \begin{array}{c} R \\ \diagdown \\ R \end{array}$$

in which R is selected from the class consisting of hydrogen, alkyl of 1 to 12 carbon atoms, phenyl, alkyl-substituted phenyl in which the alkyl contains up to 8 carbon atoms, benzyl, octylbenzyl, dimethylbenzyl and dibutylbenzyl.

2. The compound 1-(2-aminoethyl)-3-(1-aminoethyl)-2,2-dimethylcyclobutane.
3. The compound 1-(2-methylaminoethyl)-3-(1-methylaminoethyl)-2,2-dimethylcyclobutane.
4. The compound 1-(2-dimethylaminoethyl)-3 - (1 - dimethylaminoethyl)-2,2-dimethylcyclobutane.
5. The compound 1-(2-isobutylaminoethyl)-3 - (1 - isobutylaminoethyl)-2,2-dimethylcyclobutane.
6. A method for the preparation of a compound defined in claim 1 comprising reacting α-pinene with ozone in the presence of an alkanol containing from 1 to 8 carbon atoms at a temperature of about —40° to about +40° C. followed by reacting the ozonide formed with hydrogen at a temperature of about —40° C. to about +50° C. at a pressure of about 50 to about 500 p.s.i.g. and then with a compound having the formula

RRNH at a temperature of about 50° to about 250° C. at a pressure of about 300 to 3000 p.s.i.g.
7. A method according to claim 6 in which the reaction with hydrogen is conducted at about 0° to about 20° C. at a pressure of about 50 to about 200 p.s.i.g. and the reaction with said RRNH is conducted at about 60° to about 100° at a pressure of about 500 to 1000 p.s.i.g.

References Cited

UNITED STATES PATENTS 2,750,411   6/1956   Fisher et al. _____ 260—557 XR

OTHER REFERENCES

Applequist et al., J. Am. Chem. Soc., vol. 78, pp. 4012–4014 and 4020 (1956), QD1. A5.

Fisher et al., Ind. Eng. Chem., vol. 47, pp. 1569–1572 (1955), TP1. A58.

Nazarov et al., C. A., v. 54, pp. 1348–1349 (1960), QD1. A51.

Park et al., I. & E.C. Prod. Research Develop., vol. 4, pp. 149–153 (1965), TP1. 1532.

F. D. HIGEL, *Primary Examiner.*

U.S. Cl. X.R.

252—350, 426; 260—78, 339, 570.5, 570.8, 570.9